(12) United States Patent
Kyong et al.

(10) Patent No.: US 9,789,449 B2
(45) Date of Patent: Oct. 17, 2017

(54) REFRIGERATOR HAVING APPARATUS TO PRODUCE CARBONATED WATER

(71) Applicant: SAMSUNG ELECTRONICS CO., LTD., Suwon-si, Gyeonggi-do (KR)

(72) Inventors: Yong Soo Kyong, Seoul (KR); Sang Tak Lee, Suwon-si (KR); Kyung Ho Hwang, Anyang-si (KR); Hyun Hee Lim, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1225 days.

(21) Appl. No.: 13/855,071

(22) Filed: Apr. 2, 2013

(65) Prior Publication Data

US 2013/0309361 A1 Nov. 21, 2013

(30) Foreign Application Priority Data

May 17, 2012 (KR) .................. 10-2012-0052302

(51) Int. Cl.
*B01F 3/04* (2006.01)
*F25D 23/12* (2006.01)
(Continued)

(52) U.S. Cl.
CPC ............ *B01F 3/04808* (2013.01); *A23L 2/54* (2013.01); *B67D 1/0057* (2013.01);
(Continued)

(58) Field of Classification Search
CPC ... B01F 3/04808; A23L 2/54; F25D 2323/122
See application file for complete search history.

(56) References Cited

U.S. PATENT DOCUMENTS 3,259,273 A * 7/1966 Kromer .............. B01F 3/04808
222/1
4,520,950 A * 6/1985 Jeans .................. B67D 1/0021
137/212
(Continued)

FOREIGN PATENT DOCUMENTS

CA   2 492 231    7/2006
DE   27 12 469    9/1978
(Continued)

OTHER PUBLICATIONS

U.S. Certificate of Correction dated Nov. 6, 2007 from U.S. Pat. No. 7,083,071 B1 (Ref. AA).
(Continued)

*Primary Examiner* — Jonathan Bradford
(74) *Attorney, Agent, or Firm* — Staas & Halsey LLP

(57) ABSTRACT

A refrigerator having a carbonated water production module integrally provided with a carbon dioxide gas cylinder having carbon dioxide gas stored therein and a carbonated water tank to mix purified water with the carbon dioxide gas to produce carbonated water. The carbonated water production module is mounted to the rear surface of the door, and thus it may be cooled by cool air in the refrigeration compartment and be easy to access, and thereby repair and replacement thereof is facilitated. The dispenser includes a carbonated water discharge channel into which carbonated water from the carbonated water tank is discharged, and a purified water discharge channel into which purified water from the water tank is discharged. Since the purified water discharge channel does not pass through the carbonated water tank, a user is allowed to selectively dispense purified water or carbonated water anytime.

21 Claims, 9 Drawing Sheets

(51) Int. Cl.
  *A23L 2/54* (2006.01)
  *B67D 1/00* (2006.01)
  *B67D 1/08* (2006.01)
  *B67D 1/12* (2006.01)
(52) U.S. Cl.
  CPC ......... *B67D 1/0871* (2013.01); *B67D 1/0884* (2013.01); *B67D 1/12* (2013.01); *B67D 1/1252* (2013.01); *F25D 23/126* (2013.01); *B67D 2001/1259* (2013.01); *F25D 2323/122* (2013.01)

(56) References Cited

U.S. PATENT DOCUMENTS

| | | | | |
|---|---|---|---|---|
| 4,866,949 | A * | 9/1989 | Rudick | B67D 1/0061 62/119 |
| 7,083,071 | B1 | 8/2006 | Crisp, III et al. | |
| 7,997,448 | B1 * | 8/2011 | Leyva | B67D 1/0044 222/1 |
| 2004/0101606 | A1 * | 5/2004 | Ling | A23B 7/148 426/419 |
| 2006/0086136 | A1 | 4/2006 | Maritan et al. | |
| 2010/0319373 | A1 * | 12/2010 | Jeong | F25C 1/08 62/137 |
| 2011/0030412 | A1 * | 2/2011 | Kim | F25D 23/126 62/391 |

FOREIGN PATENT DOCUMENTS

| | | |
|---|---|---|
| EP | 0 349 419 | 11/1989 |
| EP | 1 579 905 A2 | 9/2005 |
| EP | 1 614 986 A2 | 1/2006 |
| EP | 1 579 905 A3 | 3/2006 |
| EP | 1 614 986 A3 | 3/2007 |
| KR | 10-2005-0087535 | 8/2005 |
| KR | 10-2006-0000202 | 1/2006 |

OTHER PUBLICATIONS

Chinese Office Action dated Jun. 30, 2016 from Chinese Patent Application No. 201310180861.8, 11 pages.

Extended European Search Report dated May 13, 2016 from European Patent Application No. 13168011.8, 8 pages.

European Office Action dated Nov. 25, 2016 from European Patent Application No. 13168011.8, 6 pages.

Chinese Office Action dated Mar. 28, 2017 from Chinese Patent Application No. 201310180861.8, 5 pages.

European Office Action dated Apr. 21, 2017 from European Patent Application No. 13168011.8, 5 pages.

* cited by examiner

REFRIGERATOR HAVING APPARATUS TO PRODUCE CARBONATED WATER

CROSS-REFERENCE TO RELATED APPLICATIONS

This application claims the benefit of Korean Patent Application No. 10-2012-0052302, filed on May 17, 2012 in the Korean Intellectual Property Office, the disclosure of which is incorporated herein by reference.

BACKGROUND

1. Field

Embodiments of the present disclosure relate to a refrigerator having an apparatus to produce carbonated water.

2. Description of the Related Art

A refrigerator, which generally includes a storage compartment to store food and a cool air supply unit to supply cool air, is a home appliance used to keep food fresh. Depending on a user demand, the refrigerator may be provided with an ice making unit to make ice, and a dispenser allowing the user to reach water or ice at the outside of the refrigerator without opening the door of the refrigerator.

The refrigerator may be further provided with a carbonated water production unit to produce carbonated water. The carbonated water production unit includes a carbon dioxide gas cylinder to store high-pressure carbon dioxide gas, and a carbonated water tank to mix the carbon dioxide gas with water to produce carbonated water.

The carbonated water produced in the carbonated water tank is moveable to an external dispenser space through the dispenser such that the user reaches the carbonated water outside the refrigerator without opening the door.

However, the carbon dioxide gas cylinder and the carbonated water tank are generally arranged inside a storage compartment of the refrigerator. As a result, a tube connecting the carbonated water tank to the dispenser is long, and thereby the taste of the carbonated water may be changed as concentration of the carbonated water is changed during passage through the tube along which the carbonated water moves to the dispenser.

Furthermore, when the carbon dioxide gas cylinder is replaced with a new one, food stored in the storage compartment may need to be moved to a different position, resulting in inconvenience in replacement of the carbon dioxide gas cylinder.

SUMMARY

Therefore, it is an aspect of the present disclosure to provide a refrigerator which allows purified water and carbonated water to be selectively dispensed while preserving the unique tastes of the purified water and carbonated water by preventing intermixing therebetween.

It is another aspect of the present disclosure to provide a refrigerator that shortens the path from the carbonated water tank to the dispenser space of the dispenser to minimize loss of concentration of carbonated water when the carbonated water is dispensed.

It is another aspect of the present disclosure to provide a refrigerator that allows easy access to the carbon dioxide gas cylinder such that replacement of the carbon dioxide gas cylinder is facilitated.

It is another aspect of the present disclosure to provide a refrigerator in which the carbon dioxide gas cylinder and the carbonated water tank are configured in one module, leading to easier assembly of a product and improved use of space.

It is a further aspect of the present disclosure to provide a refrigerator in which carbonated water may be cooled and maintained at a proper temperature by cool air in the storage compartment.

Additional aspects of the disclosure will be set forth in part in the description which follows and, in part, will be apparent from the description, or may be learned by practice of the disclosure.

In accordance with one aspect of the present disclosure, a refrigerator includes a body, a storage compartment formed in the body and provided with an open front, a door to open the open front of the storage compartment, a water tank to store purified water, a carbonated water production module provided with a carbon dioxide gas cylinder having carbon dioxide gas stored therein and a carbonated water tank to mix the purified water with the carbon dioxide gas to produce carbonated water, and mounted to a rear surface of the door, and a dispenser including a dispenser space formed at the front of the door to have an open front, a carbonated water discharge channel connecting the carbonated water tank to the dispenser space to allow the carbonated water to be dispensed from the dispenser space, and a purified water discharge channel connecting the water tank to the dispenser space to allow the purified water to be dispensed from the dispenser space and not passing through the carbonated water tank.

Here, the refrigerator further may include a purified water supply channel connecting the water tank to the carbonated water tank to supply the purified water to the carbonated water tank.

The refrigerator may further include an integrated valve assembly to open and close the carbonated water discharge channel, the purified water discharge channel and the purified water supply channel.

Here, the integrated valve assembly may include a first inflow port connected to the water tank, a second inflow port connected to the carbonated water tank, a first outflow port connected to the carbonated water tank, and a second outflow port connected to the dispenser space.

The integrated valve assembly may include a purified water supply valve to open and close the purified water supply channel, a purified water discharge valve to open and close the purified water discharge channel, a carbonated water discharge valve to open and close the carbonated water discharge channel, wherein each of the purified water supply valve, the purified water discharge valve and the carbonated water discharge valve may be a solenoid valve.

The integrated valve assembly may be mounted to the rear surface of the door.

The carbonated water tank may be provided with a water level sensor to measure the amount of purified water supplied to the carbonated water tank.

Also, the carbonated water tank may be provided with a temperature sensor to measure a temperature of purified water supplied to the carbonated water tank or carbonated water produced in the carbonated water tank.

The carbonated water tank may be provided with a exhaust valve to discharge carbon dioxide gas remaining in the carbonated water tank to introduce the purified water into the carbonated water tank.

The carbonated water tank may be provided with a safety valve to discharge carbon dioxide if carbon dioxide gas supplied thereto exceeds a predetermined pressure.

Also, the carbonated water discharge channel and the purified water discharge channel may join together at one point to form an integrated discharge channel.

Further, the integrated discharge channel may be provided with a residual water discharge preventing valve to open and close the integrated discharge channel to prevent discharge of residual water.

Also, the carbonated water tank may be formed of a stainless steel material.

In accordance with another aspect of the present disclosure, a refrigerator includes a body, a storage compartment formed in the body and provided with an open front, a door to open and close the open front of the storage compartment, and a carbonated water production module arranged at a rear surface of the door to produce carbonated water, wherein the carbonated water production module includes a first module having a carbonated water tank to produce carbonated water and a first accommodation space to accommodate the carbonated water tank, and a second module having a carbon dioxide gas cylinder to supply carbon dioxide gas to the carbonated water tank and a second accommodation space to accommodate the carbon dioxide gas cylinder, the second module being arranged at a lower side of the first module.

Here, the first module may include a first cover to open and close the first accommodation space, and the second module may include a second cover to open and close the second accommodation space, wherein the first cover and the second cover may respectively open and close the first accommodation space and the second accommodation space independently of one another such that the carbon dioxide gas cylinder accommodated in the second accommodation space is allowed to be replaced by opening the second accommodation space, without opening the first accommodation space.

Here, the first cover may be provided with vent holes such that cool air in the storage compartment flows into the carbonated water tank to cool the carbonated water tank even when the first accommodation space is closed by the first cover.

Also, the refrigerator may further include an ice-making unit to make ice, and an ice guide pathway to guide ice made in the ice-making unit to an outside of the door, wherein the second module may be positioned at a lateral side of the ice guide pathway.

In accordance with another aspect of the present disclosure, a refrigerator includes a body, a storage compartment formed in the body and provided with an open front, a door to open and close the open front of the storage compartment, a water tank to store purified water, a carbonated water production module to produce carbonated water, and a dispenser arranged at the door to allow the carbonated water or the purified water to be dispensed at an outside of the refrigerator without opening the door, wherein the carbonated water production module includes a carbon dioxide gas cylinder having carbon dioxide gas stored therein, a carbonated water tank to mix the purified water with the carbon dioxide gas to produce the carbonated water, and a module case provided with an accommodation space to accommodate the carbon dioxide gas cylinder and the carbonated water tank and coupled to a rear surface of the door.

Here, the module case may include one open side allowing access to the carbonated water tank and the carbon dioxide gas cylinder accommodated in the module case with the module case coupled to the rear surface of the door, and a cover detachably coupled to the one open side such that the carbonated water tank and the carbon dioxide gas cylinder are not exposed to an outside.

Also, the module case may be provided with vent holes such that cool air in the storage compartment flows into the accommodation space to cool the carbonated water tank.

Also, the carbonated water production module may include an integrated valve assembly to control supply of the purified water from the water tank to the carbonated water tank, supply of the purified water from the water tank to the dispenser space and supply of the carbonated water from the carbonated water tank to the dispenser space, wherein the integrated valve assembly may be accommodated in the accommodation space.

In accordance with another aspect of the present disclosure, a refrigerator includes a body, an upper refrigeration compartment and a lower freezer compartment compartmentalized in the body, each of the upper refrigeration compartment and the lower freezer compartment being provided with an open front, a first refrigeration compartment door and a second refrigeration compartment door rotatably coupled to the body to open and close the open front of the refrigeration compartment, a freezer compartment door slidably coupled to the body to open and close the open front of the freezer compartment, a water tank arranged in the refrigeration compartment to store purified water, a carbonated water production module provided with a carbon dioxide gas cylinder having carbon dioxide gas stored therein and a carbonated water tank to mix the purified water with the carbon dioxide gas to produce carbonated water, and mounted to a rear surface of the first refrigeration compartment door, and a dispenser arranged at the first refrigeration compartment door to allow the purified water and the carbonated water to be dispensed at an outside of the refrigerator without opening of the first refrigeration compartment door and the second refrigeration compartment door.

In accordance with another aspect of the present disclosure, a refrigerator includes a body, a refrigeration compartment and a freezer compartment compartmentalized in the body, each of the refrigeration compartment and the freezer compartment being provided with an open front, a refrigeration compartment door rotatably coupled to the body to open and close the open front of the refrigeration compartment, a freezer compartment door rotatably coupled to the body to open and close the open front of the freezer compartment, a water tank arranged in the refrigeration compartment to store purified water, a carbonated water production module provided with a carbon dioxide gas cylinder having carbon dioxide gas stored therein and a carbonated water tank to mix the purified water with the carbon dioxide gas to produce carbonated water, and mounted to a rear surface of the refrigeration compartment door, and a dispenser arranged at the refrigeration compartment door to allow the purified water and the carbonated water to be dispensed at an outside of the refrigerator without opening of the refrigeration compartment door.

In accordance with another aspect of the present disclosure, a refrigerator includes a body, a storage compartment formed in the body and provided with an open front, a door to open the open front of the storage compartment, a water tank to store purified water, a carbon dioxide gas cylinder having carbon dioxide gas stored therein, a carbonated water tank to mix the purified water with the carbon dioxide gas to produce carbonated water, a temperature sensor to measure a temperature of purified water supplied to the carbonated water tank or carbonated water produced in the carbonated water tank, and a display unit to inform that production of the carbonated water has been completed or that a temperature of the produced carbonated water has reached a predetermined temperature.

Here, supply of the purified water to the carbonated water tank may be initiated, and when the supply of the purified water to the carbonated water tank is completed and the purified water supplied to the carbonated water tank is cooled to a predetermined temperature, supply of the carbon dioxide gas to the carbonated water tank may be initiated to produce the carbonated water, and when production of the carbonated water is completed, completion of the production of the carbonated water may be displayed.

Further, supply of the purified water to the carbonated water tank may be initiated, and when the supply of the purified water to the carbonated water tank is completed, supply of the carbon dioxide gas to the carbonated water tank may be initiated to produce the carbonated water, and when production of the carbonated water is completed and the produced carbonated water is cooled to a predetermined temperature, that the carbonated water having reached the predetermined temperature may be indicated.

Here, when the production of the carbonated water is completed, the carbonated water may be allowed to be dispensed even before the produced carbonated water is cooled to the predetermined temperature.

In accordance with another aspect of the present disclosure, a method of controlling a refrigerator includes a storage compartment, a water tank, a carbon dioxide gas cylinder, a carbonated water tank having a water level sensor and a temperature sensor, a purified water supply valve installed in a purified water supply channel connecting the water tank to the carbonated water tank, a carbon dioxide gas supply valve installed in a carbon dioxide gas supply channel connecting the carbon dioxide gas cylinder to the carbonated water tank, includes opening the purified water supply valve, measuring, through the water level sensor, the amount of purified water supplied to the carbonated water tank, closing the purified water supply valve when the amount of the purified water supplied to the carbonated water tank reaches a predetermined amount, measuring, through the temperature sensor, a temperature of the purified water supplied to the carbonated water tank, naturally cooling the purified water supplied to the carbonated water tank with cool air in the storage compartment until the temperature of the purified water supplied to the carbonated water tank reaches a predetermined temperature, and when the temperature of the purified water supplied to the carbonated water tank reaches the predetermined temperature, producing the carbonated water by opening and closing the carbon dioxide gas supply valve a predetermined number of times with a predetermined supply time per opening and closing and at a predetermined interval.

In accordance with another aspect of the present disclosure, a method of controlling a refrigerator including a storage compartment, a water tank, a carbon dioxide gas cylinder, a carbonated water tank having a water level sensor and a temperature sensor, a purified water supply valve installed in a purified water supply channel connecting the water tank to the carbonated water tank, a carbon dioxide gas supply valve installed in a carbon dioxide gas supply channel connecting the carbon dioxide gas cylinder to the carbonated water tank, includes opening the purified water supply valve, measuring, through the water level sensor, the amount of purified water supplied to the carbonated water tank, closing the purified water supply valve when the amount of the purified water supplied to the carbonated water tank reaches a predetermined amount, producing the carbonated water by opening and closing the carbon dioxide gas supply valve a predetermined number of times with a predetermined supply time per opening and closing and at a predetermined interval, measuring, through the temperature sensor, a temperature of the carbonated water produced in the carbonated water tank, naturally cooling the carbonated water produced in the carbonated water tank with cool air in the storage compartment until the temperature of the carbonated water produced in the carbonated water tank reaches a predetermined temperature, and when the temperature of the carbonated water produced in the carbonated water tank reaches the predetermined temperature, that the carbonated water has reached the predetermined temperature is indicated.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
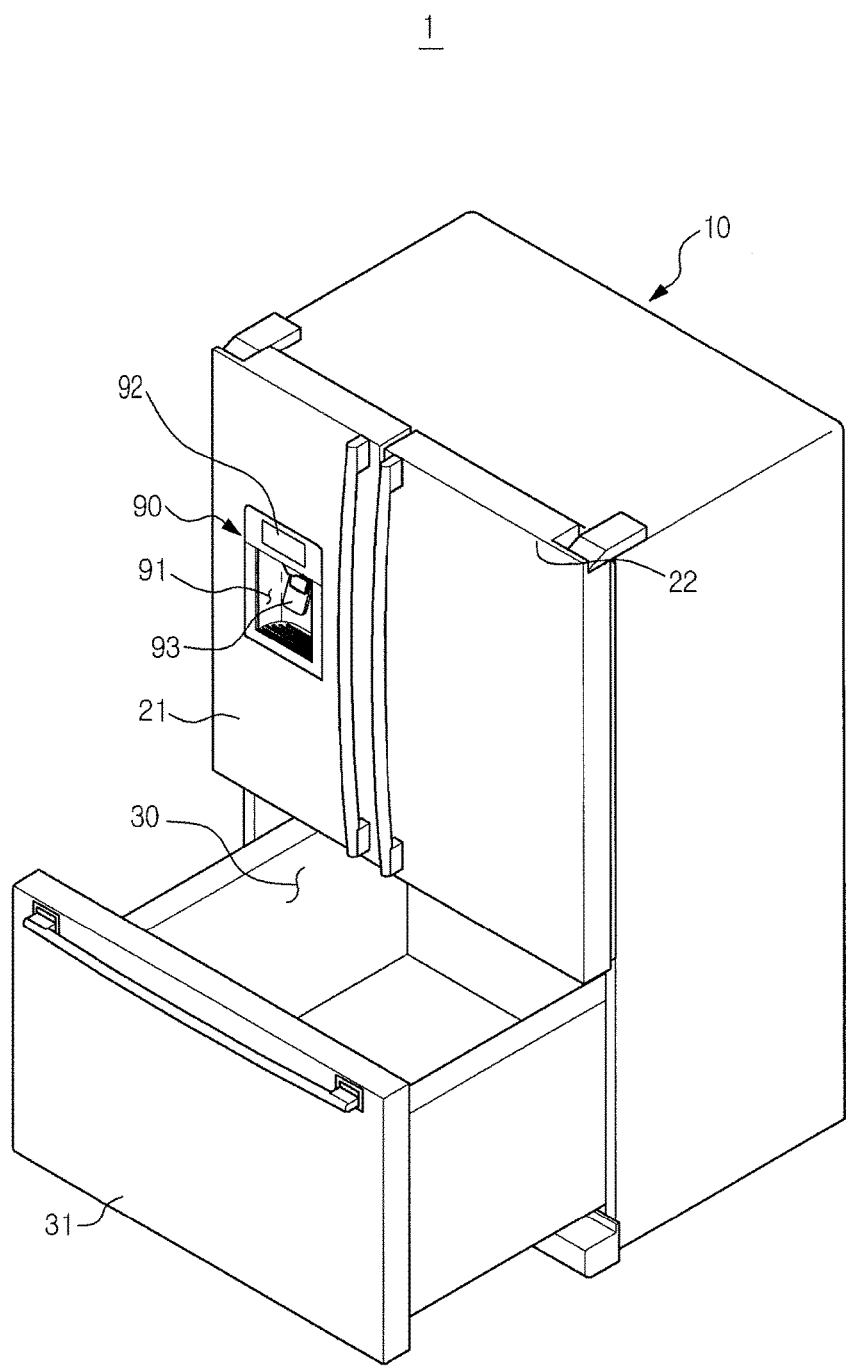
FIG. 1 is a perspective view showing the external appearance of a refrigerator according to an exemplary embodiment of the present disclosure.

Reference will now be made in detail to the embodiments of the present disclosure, examples of which are illustrated in the accompanying drawings, wherein like reference numerals refer to like elements throughout.

Figure 2:
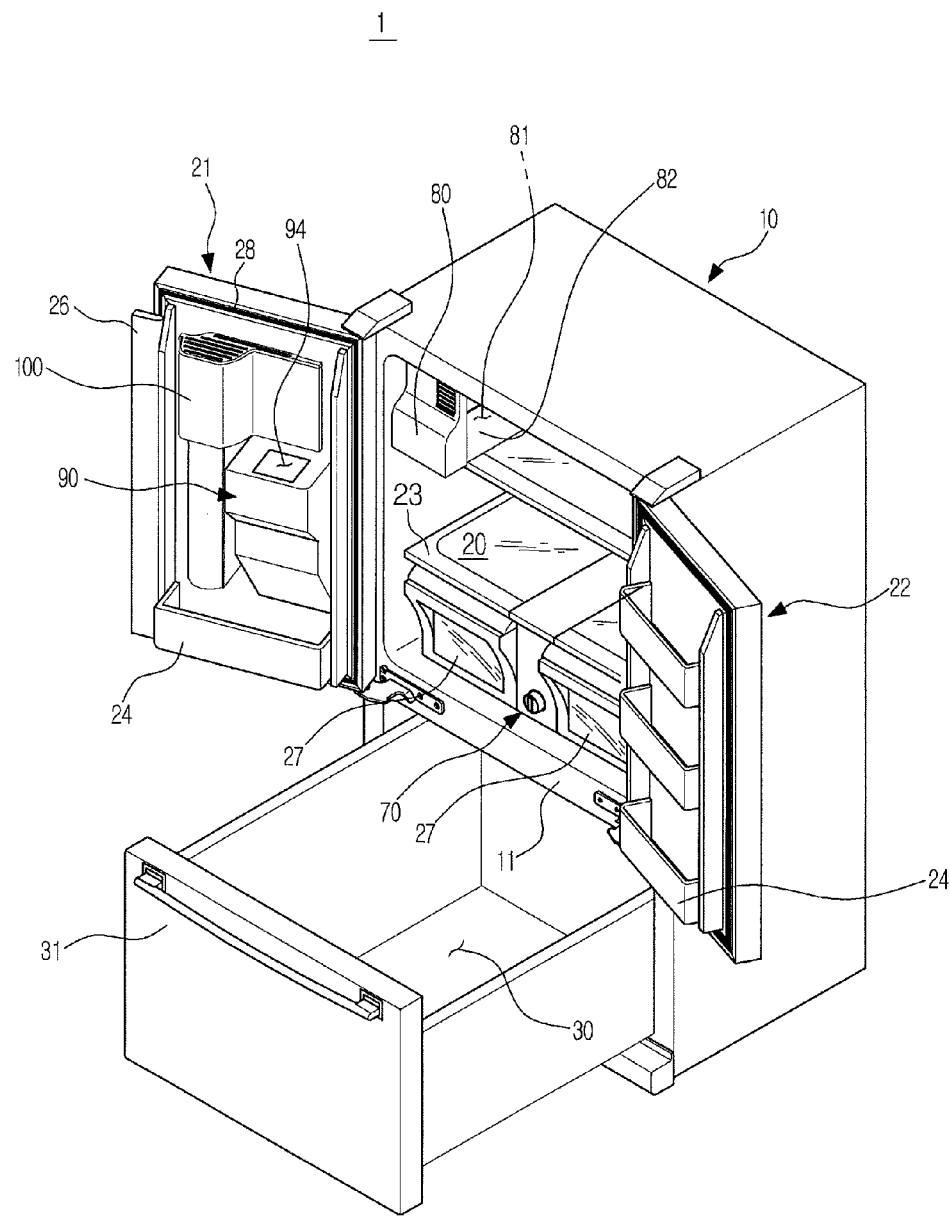
FIG. 2 is a perspective view showing the interior of the refrigerator of FIG. 1.

FIG. 1 is a perspective view showing the external appearance of a refrigerator according to an exemplary embodiment of the present disclosure, and FIG. 2 is a perspective view showing the interior of the refrigerator of FIG. 1.

Referring to FIGS. 1 and 2, a refrigerator 1 according to the illustrated embodiment may include a body 10, storage compartments 20 and 30 formed in the body 10, and a cool air supply unit (not shown) to provide cool air to the storage compartments 20 and 30.

The body 10 may include an inner case to define the storage compartments 20 and 30, an outer case coupled to the outside of the inner case to form an external appearance of the refrigerator, thermal insulation disposed between the inner case and the outer case to insulate the storage compartments 20 and 30.

The storage compartments 20 and 30 may be divided into an upper refrigeration compartment 20 and a lower freezer compartment 30 by an intermediate partition 11. The temperature of the refrigeration compartment 20 may be maintained at about 3° C. to keep food in a cooled state, while the temperature of the freezer compartment 30 may be maintained at about −18.5° C. to keep food in a frozen state. The refrigeration compartment 20 may be provided with a shelf 23 allowing food to be place thereon, and at least one storage box 27 to store food in a sealed state.

Also, an ice-making compartment 81 to make ice may be provided at an upper corner of the refrigeration compartment 20, compartmentalized separately from the refrigeration compartment 20 by the ice-making compartment case 82. The ice-making compartment 81 may be provided with an ice-making tray to make ice, and an ice-making unit 80 such as an ice bucket to store the ice made in ice-making tray.

Meanwhile the refrigeration compartment 20 may be provided with a water tank 70 to retain water. The water tank 70 may be provided between storage boxes 27 as shown in FIG. 2, but embodiments of the present disclosure are not limited thereto. The water tank 70 may be placed at any position in the refrigeration compartment 20 so long as the position allows the water tank 70 to be cooled by the cool air in the refrigeration compartment 20.

Figure 5:
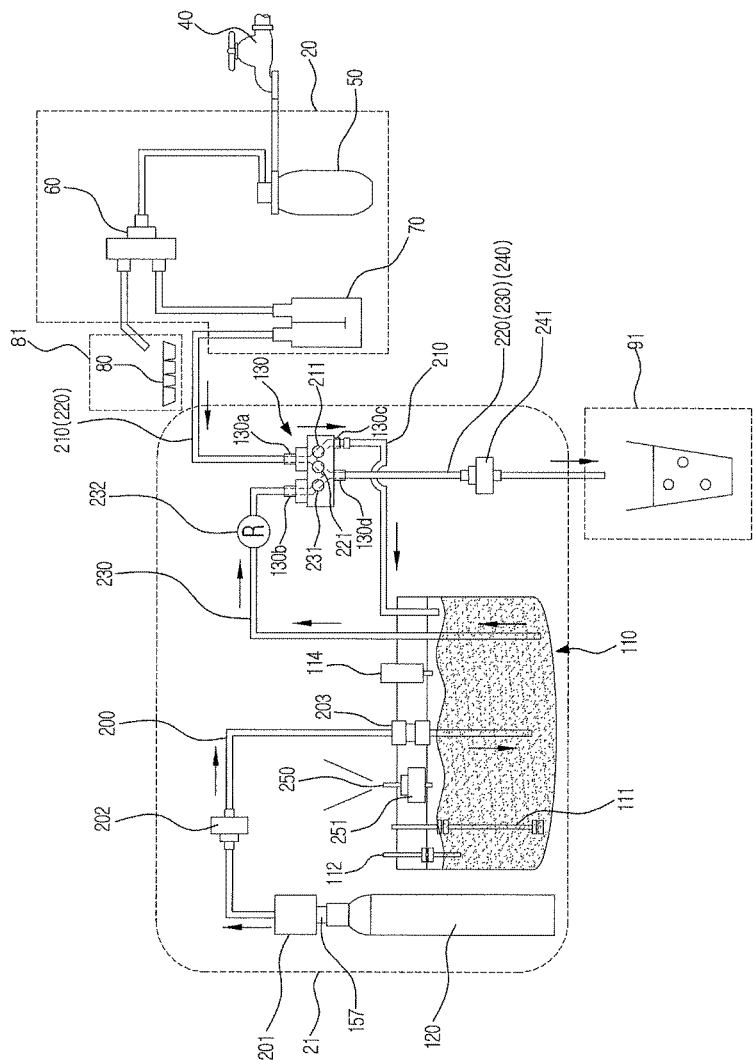
FIG. 5 is a conceptual diagram illustrating production and discharge of carbonated water by the refrigerator of FIG. 1.

The water tank 70 may be connected to an external water supply source 40 (FIG. 5) such as a faucet, and may retain water purified through a water purifying filter 50 (FIG. 5). The water supply pipe connecting the external water supply source 40 to the water tank 70 may be provided with a channel diversion valve 60 (FIG. 5), and water may be supplied to the ice-making unit 80 via the channel diversion valve 60.

Each of the refrigeration compartment 20 and the freezer compartment 30 may have an open front allowing food to be stored and retrieved therethrough. The open front of the refrigeration compartment 20 may be opened and closed by a pair of swiveling doors 21 and 22 hinged to the body 10, while the open front of the freezer compartment 30 may be opened and closed by a sliding door 31 which is slidably movable with respect to the body 10. Provided at the rear surface of each of the refrigeration compartment doors 21 and 22 is a door guide 24 allowing food to be stored therein.

Meanwhile, gaskets 28 may be provided at the edge of the rear surfaces of the refrigeration compartment doors 21 and 22 to seal the gap between the refrigeration compartment doors 21 and 22 and the body 10 when the refrigeration compartment doors 21 and 22 are closed, thereby controlling leakage of the cool air from the refrigeration compartment 20. Also, one refrigeration compartment door 21 of the refrigeration compartment doors 21 and 22 may be provided with a rotating bar 26 to seal the gap between the refrigeration compartment door 21 and the refrigeration compartment door 22 when the refrigeration compartment doors 21 and 22 are closed, thereby controlling leakage of the cool air from the refrigeration compartment 20.

Also, one refrigeration compartment door 21 of the refrigeration compartment doors 21 and 22 may be provided with a dispenser 90 allowing a user to dispense water or ice at the outside of the refrigerator 1 without opening the refrigeration compartment door 21.

The dispenser 90 may include a dispenser space 91 allowing a vessel such as a cup to be inserted therein to receive water or ice, a control panel 92 provided with an input button to adjust settings of the dispenser 90 and a display unit to display various information on the dispenser 90, and an operation lever 93 to operate the dispenser 90 to discharge water or ice.

Also, the dispenser 90 may include an ice guide passage 94 connecting the ice-making unit 80 to the dispenser space 91 to allow ice made in the ice-making unit 80 to be discharged to the dispenser space 91.

Meanwhile, a carbonated water production module 100 to produce carbonated water may be mounted to the rear surface of the refrigeration compartment door 21 on which the dispenser 90 of the refrigerator 1 according to the illustrated embodiment is provided. A detailed description of the carbonated water production module 100 will be given below.

Figure 3:
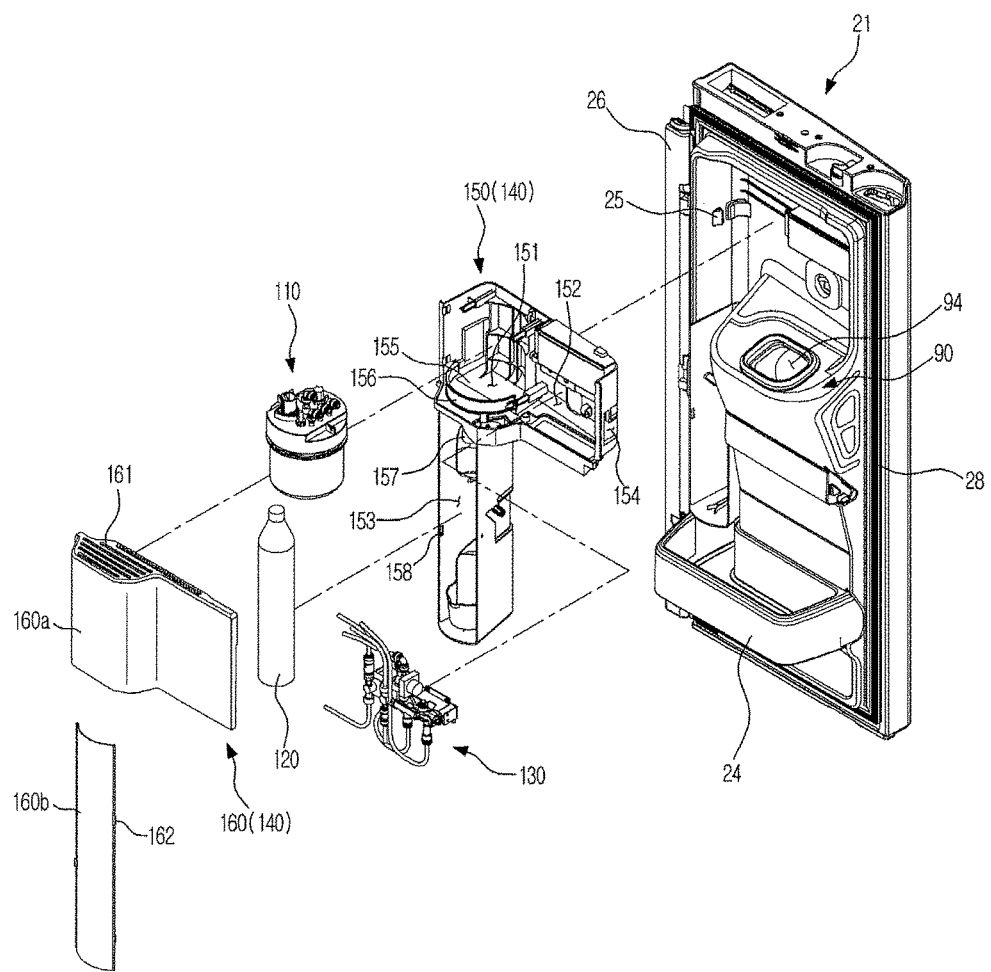
FIG. 3 is an exploded perspective view illustrating assembly of a carbonated water production module of the refrigerator of FIG. 1.
Figure 4:
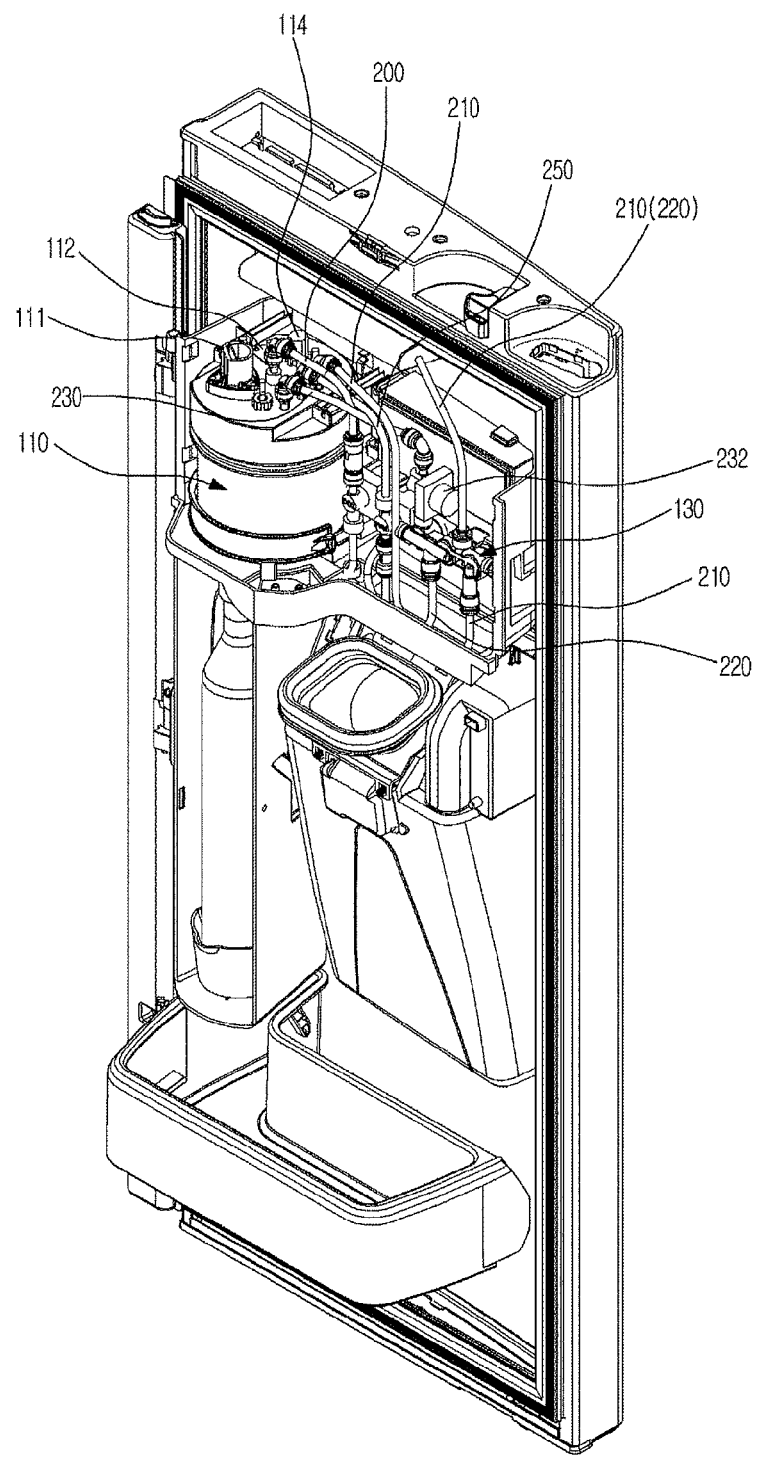
FIG. 4 is a perspective view illustrating the carbonated water production module of the refrigerator of FIG. 1 with the cover thereof removed.

FIG. 3 is an exploded perspective view illustrating assembly of a carbonated water production module of the refrigerator of FIG. 1, FIG. 4 is a perspective view illustrating the carbonated water production module of the refrigerator of FIG. 1 with the cover thereof removed, and FIG. 5 is a conceptual diagram illustrating production and discharge of carbonated water by the refrigerator of FIG. 1.

As shown in FIGS. 3 to 5, the carbonated water production module 100, which is arranged in the refrigerator 1 to produce carbonated water, may include a carbon dioxide gas cylinder 120 having high-pressure carbon dioxide gas stored therein, a carbonated water tank 110 to produce carbonated water by mixing purified water with the carbon dioxide gas, a module case 140 provided therein with accommodation spaces 151, 152 and 153 to accommodate the carbon dioxide gas cylinder 120 and the carbonated water tank 110 and coupled to the rear surface of the refrigeration compartment door 21, and an integrated valve assembly 130.

The carbon dioxide gas cylinder 120 may have a high-pressure carbon dioxide gas stored therein at a pressure between about 45 bar and about 60 bar. The carbon dioxide gas cylinder 120 may be mounted to a cylinder connector 157 of the module case 140, and may be accommodated in the lower accommodation space 153 of the module case 140.

The carbon dioxide gas in the carbon dioxide gas cylinder 120 may be supplied to the carbonated water tank 110 through a carbon dioxide gas supply channel 200 connected between the carbon dioxide gas cylinder 120 and the carbonated water tank 110.

The carbon dioxide gas supply channel 200 may be provided with a carbon dioxide gas regulator 201 to regulate the pressure of the carbon dioxide gas, a carbon dioxide gas supply valve 202 to open and close the carbon dioxide gas supply channel 200, a carbon dioxide gas backflow preventing valve 203 to prevent backflow of the carbon dioxide gas.

The carbon dioxide gas regulator 201 may regulate the pressure of the carbon dioxide gas discharged from the carbon dioxide gas cylinder 120 to supply the carbon dioxide gas to the carbonated water tank 110. The carbon dioxide gas regulator 201 may reduce the pressure of the carbon dioxide gas below about 10 bar.

The carbonated water tank 110 may produce carbonated water by mixing the carbon dioxide supplied from the carbon dioxide gas cylinder 120 with the purified water supplied from the water tank 70 and retain the produced carbonated water therein.

In addition to the carbon dioxide gas supply channel 200 described above, a purified water supply channel 210 to receive purified water from the water tank 70, a carbonated water discharge channel 230 to discharge the produced carbonated water to the dispenser space 91, and a exhaust channel 250 to exhaust residual carbon dioxide gas from the carbonated water tank 110 to allow purified water to be supplied to the carbonated water tank 110 may be connected to the carbonated water tank 110.

The purified water supply channel 210 may be provided with a purified water supply valve 211 to open and close the purified water supply channel 210. The carbonated water discharge channel 230 may be provided with a carbonated water discharge valve 231 to open and close the carbonated water discharge channel 230, and a carbonated water regulator 232 to regulate the pressure of the discharged carbonated water. The exhaust channel 250 may be provided with an exhaust valve 251 to open and close the exhaust channel 250.

Here, the purified water supply valve 211 and the carbonated water discharge valve 231 may be solenoid valves.

Meanwhile, the carbonated water tank 110 may be provided with a water level sensor 111 to measure the amount of purified water supplied to the carbonated water tank 110, and a temperature sensor 112 to measure the temperature of the purified water supplied to the carbonated water tank 110 or the carbonated water produced in the carbonated water tank 110.

The carbonated water tank 110 may also be provided with a safety valve 114 adapted to emit high-pressure carbon dioxide gas supplied to the carbonated water tank 110 in case that the pressure of the supplied high-pressure carbon dioxide gas exceeds a predetermined pressure due to malfunction of the carbon dioxide gas regulator 201.

The carbonated water tank 110 may have a predetermined volume, and may be formed to accommodate about 1 l of purified water. Further, the carbonated water tank 110 may be formed of a stainless material to minimize the space occupied by the carbonated water tank 110 and to endure high pressure and have corrosion resistance. The carbonated water tank 110 may be accommodated in the first upper accommodation space 151 of the module case 140. The carbonated water tank 110 may be supported by a bottom support 155 and guide portion 156 of the module case 140.

Meanwhile, the purified water supply valve 211 and the carbonated water discharge valve 231 described above may form an integrated valve assembly 130, together with the purified water discharge valve 221 provided in the purified water discharge channel 220 through which the purified water is directly discharged from the water tank 70 to the dispenser space 91. That is, the purified water supply valve 211, the carbonated water discharge valve 231 and the purified water discharge valve 221 may be integrated to form a unit. Here, the purified water discharge valve 221 may be a solenoid valve as the purified water supply valve 211 and the carbonated water discharge valve 231.

The integrated valve assembly 130 may include a first inflow port 130a connected to the water tank 70, a second inflow port 130b connected to the carbonated water tank 110, a first outflow port 130c connected to the carbonated water tank 110, and a second outflow port 130d connected to the dispenser space 91.

The purified water supply channel 210 and the purified water discharge channel 220 may pass through the first inflow port 130a, while the carbonated water discharge channel 230 may pass through the second inflow port 130b. The purified water supply channel 210 may pass through the first outflow port 130c, while the purified water discharge channel 220 and the carbonated water discharge channel 230 may pass through the second outflow port 130d.

The purified water supply valve 211, the purified water discharge valve 221 and the carbonated water discharge valve 231 are independently opened and closed respectively. Supply of purified water from the water tank 70 to the carbonated water tank 110 and discharge of the purified water from the water tank 70 to the dispenser space 91 may be performed at the same time. Supply of purified water from the water tank 70 to the carbonated water tank 110 and discharge of carbonated water from the carbonated water tank 110 to the dispenser space 91 may also be performed at the same time.

Also, the integrated valve assembly 130 in the illustrated embodiment has three independent valves 211, 221 and 231 as above, but embodiments of the present disclosures are not limited thereto. The integrated valve assembly 130 may include a 3-way channel diversion valve to selectively direct flow of purified water from the water tank 70 to the carbonated water tank 110 or to the dispenser space 91, and a 3-way channel diversion valve allowing purified water to be supplied from the water tank 70 to the dispenser space 91 or carbonated water to be supplied from the carbonated water tank 110 to the dispenser space 91.

The integrated valve assembly 130 as above may be accommodated in the second upper accommodation space 152 of the module case 140.

The purified water discharge channel 220 to discharge purified water from the water tank 70 directly to the dispenser space 91 and the carbonated water discharge channel 230 to discharge carbonated water from the carbonated water tank 110 directly to the dispenser space 91 may meet at a point to form an integrated discharge channel 240.

The purified water discharge channel 220 and the carbonated water discharge channel 230 may meet each other inside the integrated valve assembly 130 or at the second outflow port 130d. Accordingly, the purified water discharge channel 220 and the carbonated water discharge channel 230 may be joined to form one channel leading to the dispenser space 91, not separately extending to the dispenser space 91. Alternatively, the purified water discharge channel 200 and the carbonated water discharge channel 230 may not join together but separately extend to the dispenser space 91.

Such an integrated discharge channel 240 may be provided with a residual water discharge preventing valve 241 to open and close the integrated discharge channel 240 such that purified residual water or carbonated residual water in the integrated discharge channel 240 is prevented from being discharged to the dispenser space 91 if the purified water discharge valve 221 and the carbonated water discharge valve 231 are closed. The residual water discharge preventing valve 241 may be provided at the end portion of the integrated discharge channel 240, if possible.

The module case 140 may include a back case 150 having an open side and a cover 160 coupled to the open side of the back case 150.

The module case 140 may be provided with at least one insertion groove 154 formed at a position corresponding to at least one insertion protrusion 25 formed on the rear surface of the door 21. Therefore, by inserting insertion protrusion 25 into the insertion groove 154, the module case 140 may be easily mounted to the rear surface of the door 21. However, embodiments of the present disclosure are not limited to this illustrative coupling technique. The module case 140 may be detachably mounted to the door 21 through various coupling techniques other than the inserting technique, such as screw-coupling and hook-coupling.

Also, the back case 150 and the cover 160 may be respectively provided with an insertion groove 158 and an insertion protrusion 162 at positions corresponding to each other such that the cover 160 is coupled to the back case 150. However, embodiments of the present disclosure are not limited to this illustrative coupling technique. The back case 150 and the cover 160 may also be detachably coupled to each other through various coupling techniques.

When the cover 160 is coupled to the back case 150, the carbon dioxide cylinder 120, the carbonated water tank 110 and the integrated module assembly 130 arranged in the module case 140 may not be exposed to the outside. Accordingly, aesthetics of the door 21 may not be degraded.

The cover 160 may be provided with vent holes 161 through which the interior of the module case 140 communicates with the exterior thereof, and thereby even when the cover 160 is coupled to the back case 150, the cool air in the storage compartment may be supplied to the carbonated water tank 110 in the module case 140 to cool or maintain the carbonated water stored in the carbonated water tank 110 at a proper temperature.

Also, the cover 160 may be arranged to be separated into a first cover 160a to open and close the upper accommodation spaces 151 and 152 in which the carbonated water tank 110 and the integrated valve assembly 130 are accommodated, and a second cover 160b to open and close the lower accommodation space 153 in which the carbon dioxide gas cylinder 120 is accommodated. The first cover 160a and the second cover 160b may be independently opened and closed.

Accordingly, when the carbon dioxide gas in the carbon dioxide gas cylinder 120 is exhausted and thus the carbon dioxide gas cylinder 120 needs to be replaced, replacement of the carbon dioxide gas cylinder 120 may be performed by removing the second cover 160b but not opening the first cover 160a. Therefore, as the first cover 160a is allowed to remain closed in replacement of the carbon dioxide gas cylinder 120, leakage of the cool air in the upper accommodation space 151 may be prevented.

According to another aspect, the carbonated water production module 100 of the refrigerator according to the illustrated embodiment of the present disclosure may include a first module having the carbonated water tank 110 and the first accommodation space 151 to accommodate the carbonated water tank 110, and a second module having the carbon dioxide gas cylinder 120 and the second accommodation space 153 to accommodate the carbon dioxide gas cylinder 120.

The second module may be arranged below the first module. Also, the second module may be provided at a lateral side of the ice guide passage 94 which guides ice made in the ice-making unit 80 to the dispenser space 91.

Also, the first module may include a first cover 160a to open and close the first accommodation space 151, and the second module may include a second cover 160b to open and close the second accommodation space 153 independently of the first cover 160a.

Figure 6:
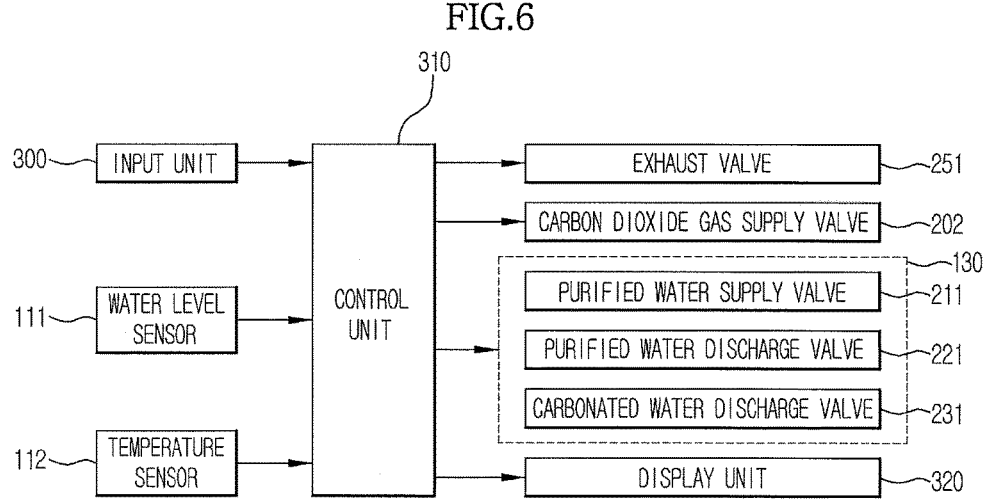
FIG. 6 is a block diagram illustrating a method of controlling the refrigerator of FIG. 1.
Figure 7:
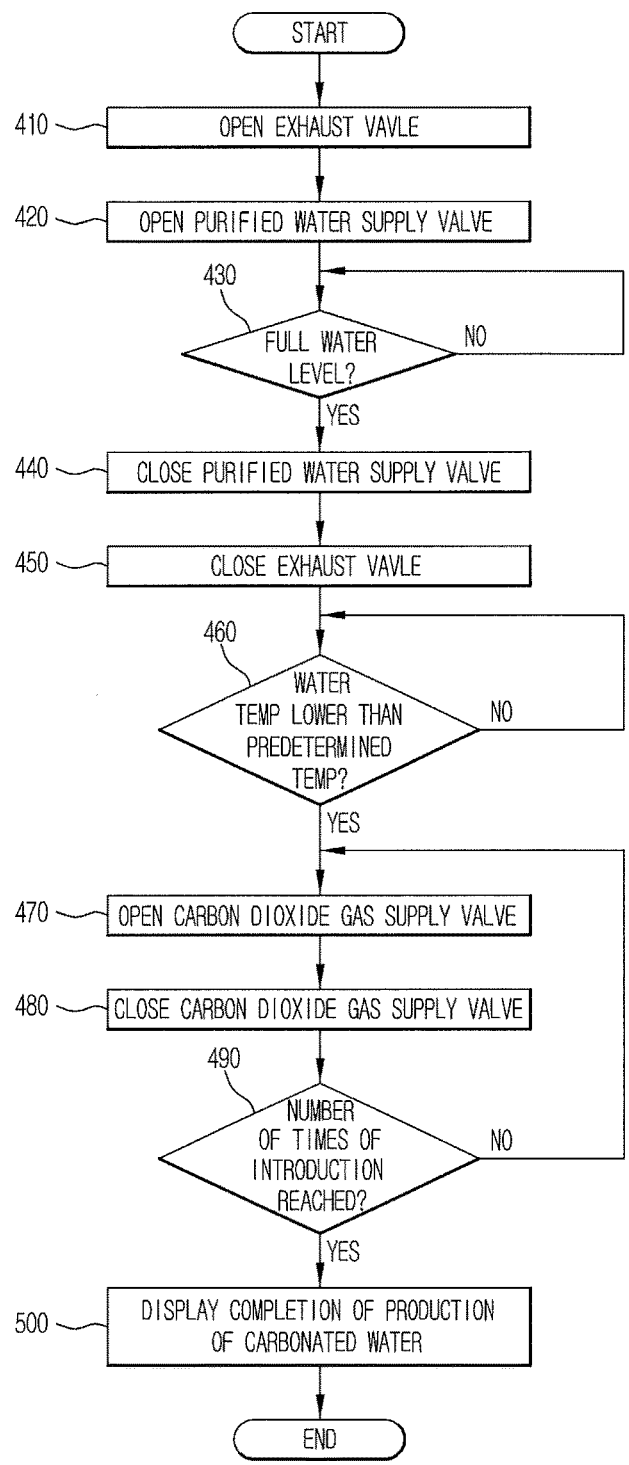
FIG. 7 is a flowchart illustrating the method of controlling the refrigerator of FIG. 1.
Figure 8:
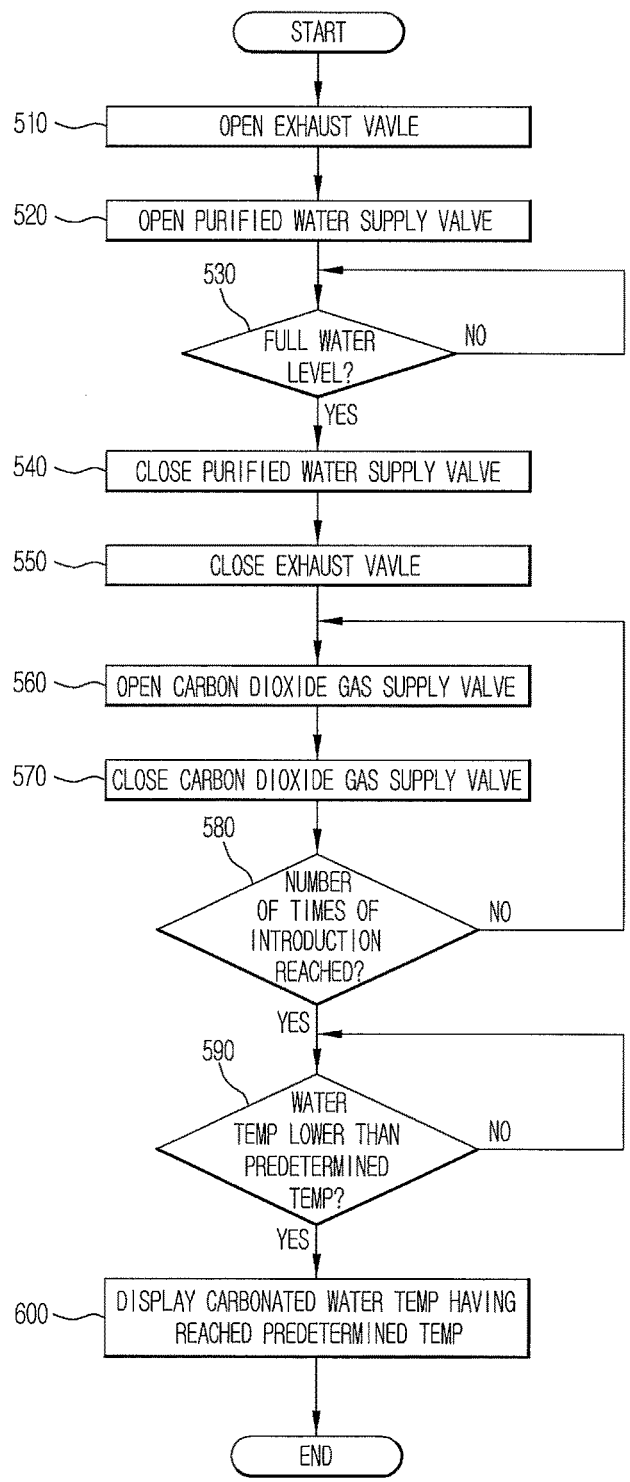
FIG. 8 is a flowchart illustrating another method of controlling the refrigerator of FIG. 1.

FIG. 6 is a block diagram illustrating a method of controlling the refrigerator of FIG. 1, FIG. 7 is a flowchart illustrating the method of controlling the refrigerator of FIG. 1, and FIG. 8 is a flowchart illustrating another method of controlling the refrigerator of FIG. 1.

Production and discharge of carbonated water of the refrigerator will be described below with reference to FIGS. 5 to 8.

As shown in FIG. 6, the refrigerator according to the illustrated embodiment may further include, an input unit 300 to input discharge of carbonated water or purified water, and a display unit 320 to indicate production of carbonated water, in addition to the water level sensor 111, the temperature sensor 112, the exhaust valve 251, the carbon dioxide gas supply valve 202, and the integrated valve assembly 130 integrally provided with the purified water supply valve 211, the purified water discharge valve 221 and the carbonated water discharge valve 231 as previously described.

Also, the refrigerator may further include a control unit 310 to control opening and closing of the exhaust valve 251, the carbon dioxide gas supply valve 202 and the integrated valve assembly 130 integrally provided with the purified water supply valve 211, the purified water discharge valve 221 and the carbonated water discharge valve 231, and operation of the display unit 320, based on information transmitted from the water level sensor 111, the temperature sensor 112 and the input unit 300.

The refrigerator may be controlled mainly in two different methods, the first of which is illustrated in FIG. 7.

The control unit 310 may first open the exhaust valve 251 to exhaust residual carbon dioxide gas from the carbonated water tank 110 (410).

Next, the purified water supply valve 211 may be opened to start supply of purified water from the water tank 70 to the carbonated water tank 110 (420).

After supply of purified water is started, the control unit 310 may receive information on the amount of purified water supplied to the carbonated water tank 110 from the water level sensor 111 and determine whether the amount of purified water supplied to the carbonated water tank 110 has reached a predetermined amount (430).

If the amount of purified water supplied to the carbonated water tank 110 has reached the predetermined amount, the control unit 310 closes the purified water supply valve 211 to terminate supply of purified water from the water tank 70 to the carbonated water tank 110 (440).

Next, the control unit 310 may close the exhaust valve 251 (450).

Next, the control unit 310 may receive information on temperature of the purified water supplied to the carbonated water tank 110 from the temperature sensor 112, and determine whether the temperature of the purified water supplied to the carbonated water tank 110 has reached a predetermined temperature (460).

If the temperature of the purified water supplied to the carbonated water tank 110 has not reached the predetermined temperature, the control unit 310 may stand by until the purified water supplied to the carbonated water tank 110 is naturally cooled by the cool air in the refrigeration compartment 20.

If the temperature of the purified water supplied to the carbonated water tank 110 has reached the predetermined temperature, the control unit 310 may open the carbon dioxide gas supply valve 202 to allow supply of carbon dioxide gas from the carbon dioxide gas cylinder 120 to the carbonated water tank 110 (470).

If a predetermined time of supply has elapsed after the carbon dioxide gas supply valve 202 is opened, the control unit 310 may close the carbon dioxide gas supply valve 202 (480).

When the carbon dioxide gas supply valve 202 is closed, the control unit 310 may determine whether the number of openings and closings of the carbon dioxide gas supply valve 202 has reached a predetermined number of times (490).

If the number of openings and closings of the carbon dioxide gas supply valve 202 has reached the predetermined number of times, the control unit 310 may display completion of production of carbonated water through the display unit 320 (500).

If the number of openings and closings of the carbon dioxide gas supply valve 202 has not reached the predetermined number of times, the control unit 310 may open the carbon dioxide gas supply valve 202 again after a predetermined standby time has elapsed after the carbon dioxide gas supply valve 202 is closed (470). During this standby time, the carbon dioxide gas supplied to the carbonated water tank 110 may be dissociated in purified water.

As such, supplying purified water to the carbonated water tank 110 prior to supply of carbon dioxide gas is intended to prevent the pressure of carbon dioxide gas from causing unnatural supply or backflow of purified water.

A second method of control is illustrated in FIG. 8.

The control unit 310 may first open the exhaust valve 251 to exhaust residual carbon dioxide gas from the carbonated water tank 110 (510).

Next, the purified water supply valve 211 may be opened to start supply of purified water from the water tank 70 to the carbonated water tank 110 (520).

After supply of purified water is started, the control unit 310 may receive information on the amount of purified water supplied to the carbonated water tank 110 from the water level sensor 111 and determine whether the amount of purified water supplied to the carbonated water tank 110 has reached a predetermined amount (530).

If the amount of purified water supplied the carbonated water tank 110 has reached the predetermined amount, the control unit 310 closes the purified water supply valve 211 to terminate supply of purified water from the water tank 70 to the carbonated water tank 110 (540).

Next, the control unit 310 may close the exhaust valve 251 (550).

Next, the control unit 310 may open the carbon dioxide gas supply valve 202 to allow supply of carbon dioxide gas from the carbon dioxide gas cylinder 120 to the carbonated water tank 110 (560).

The control unit 310 may open the carbon dioxide gas supply valve 202 to allow supply of carbon dioxide gas from the carbon dioxide gas cylinder 120 to the carbonated water tank 110 (570).

When the carbon dioxide gas supply valve 202 is closed, the control unit 310 may determine whether the number of openings and closings of the carbon dioxide gas supply valve 202 has reached a predetermined number of times (580).

If the number of openings and closings of the carbon dioxide gas supply valve 202 has not reached the predetermined number of times, the control unit 310 may open the carbon dioxide gas supply valve 202 again after a predetermined standby time has elapsed after the carbon dioxide gas supply valve 202 is closed (560). During the standby time, the carbon dioxide gas supplied to the carbonated water tank 110 may dissolve in purified water.

If the number of openings and closings of the carbon dioxide gas supply valve 202 has reached the predetermined number of times, the control unit 310 may receive information on temperature of carbonated water produced in the carbonated water tank 110 from the temperature sensor 112, and determine whether the temperature of the carbonated water produced in the carbonated water tank 110 has reached a predetermined temperature (590).

If the temperature of the carbonated water produced in the carbonated water tank 110 has not reached the predetermined temperature, the control unit 310 may stand by until the carbonated water produced in the carbonated water tank 110 is naturally cooled by the cool air in the refrigeration compartment 20. At this time, the control unit 310 may display completion of production of carbonated water through the display unit 320. Accordingly, a user may retrieve carbonated water even before the temperature of the carbonated water reaches the predetermined temperature, if necessary.

If the temperature of the carbonated water produced in the carbonated water tank 110 has reached the predetermined temperature, the control unit 310 may indicate through the display unit 320 that the carbonated water has reached the temperature proper for the carbonated water to be dispensed (600).

Figure 9:
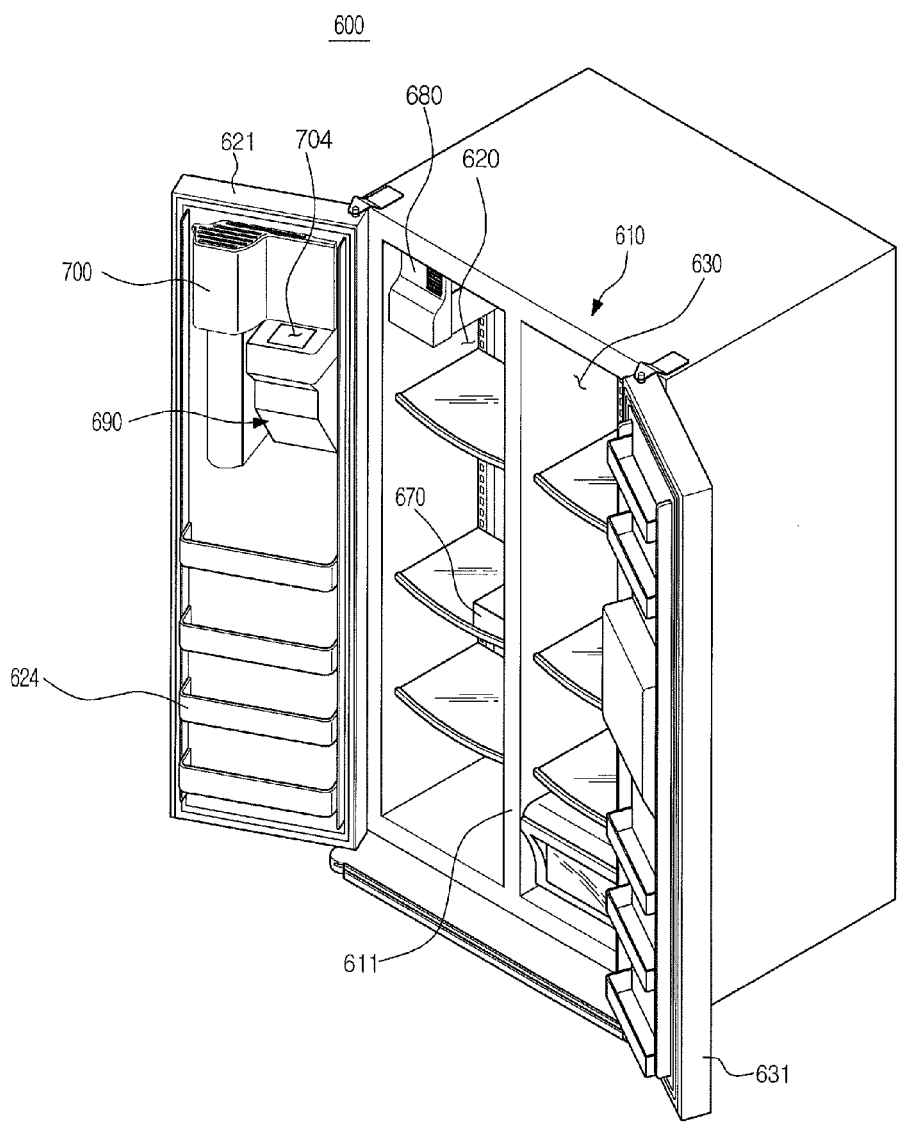
FIG. 9 is a view illustrating the interior of a refrigerator according to another embodiment of the present disclosure.

FIG. 9 is a view illustrating the interior of a refrigerator according to another embodiment of the present disclosure.

As shown in FIG. 9, the spirit of the present disclosure is applicable not only to French door refrigerators (FDRs) as described above but also to side-by-side (SBS) refrigerators. The refrigerator 600 may have storage compartments 620 and 630 formed in a body 610 vertically divided by a vertical partition 611 and an ice-making unit 680.

Each of the storage compartments 620 and 630 may be used as a refrigeration compartment or freezer compartment. In FIG. 9, the storage compartment 620 on the left is used as a refrigeration compartment, and the storage compartment 630 on the right is used as a freezer compartment.

Each of the refrigeration compartment 620 and the freezer compartment 630 is formed to have an open front, and the open front may be opened and closed by a pair of rotatable doors 621 and 631. The doors 621 and 631 may be provided with door guides 624 where food may be stored.

The refrigeration compartment 620 may be provided with a water tank 670 to store purified water. The purified water stored in the water tank 670 may be naturally cooled by the cool air in the refrigeration compartment 620. Also, the refrigeration compartment door 621 may be provided with a dispenser 690 allowing a user to dispense purified water or carbonated water at the outside without opening the refrigeration compartment door 621, and the dispenser 690 may be provided with an ice guide pathway 704 to guide ice.

Also, a carbonated water production module 700 having the same structure as the carbonated water production module of the refrigerator according to one embodiment of the present disclosure may be mounted to the rear surface of the refrigeration compartment door 621.

As is apparent from the above description, the carbon dioxide gas cylinder and the carbonated water tank are configured in a module to be mounted to the rear surface of the door, and therefore assembly thereof may be facilitated.

Also, since the carbon dioxide gas cylinder is accessible without movement of stored food, replacement and repair of the carbon dioxide gas cylinder may be facilitated.

In addition, since the path from the carbonated water tank to the dispenser space of the dispenser is short, carbonated water may be dispensed with a minimal loss of concentration thereof.

Furthermore, since the dispenser is provided with a carbonated water discharge channel to connect the carbonated water tank to dispenser space and a purified water discharge channel to connect the water tank to the dispenser space, and the purified water discharge channel is arranged not to pass through the carbonated water tank, a user may be able to selectively dispense one of the purified water and the carbonated water.

Finally, the carbonated water tank may not only be cooled and maintained at a proper temperature by cool air inside the storage compartment, but also produce and maintain carbonated water at a temperature suitable for use thereof, through a temperature sensor provided at the carbonated water tank, and display the temperature.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A refrigerator comprising:
a body;
a storage compartment formed in the body and provided with an open front;
a door to open the open front of the storage compartment;
a water tank to store purified water;
a carbonated water production module provided with a carbon dioxide gas cylinder having carbon dioxide gas stored therein, a carbonated water tank to mix the purified water with the carbon dioxide gas to produce carbonated water, and a module case accommodating the carbon dioxide gas cylinder and the carbonated water tank, and being detachably mounted to a rear surface of the door; and
a dispenser including a dispenser space formed at the front of the door to have an open front, a carbonated water discharge channel connecting the carbonated water tank to the dispenser space to allow the carbonated water to be dispensed from the dispenser space, and a purified water discharge channel connecting the water tank to the dispenser space to allow the purified water to be dispensed from the dispenser space and not passing through the carbonated water tank.

2. The refrigerator according to claim 1, further comprising a purified water supply channel connecting the water tank to the carbonated water tank to supply the purified water to the carbonated water tank.

3. The refrigerator according to claim 2, further comprising an integrated valve assembly to open and close the carbonated water discharge channel, the purified water discharge channel and the purified water supply channel.

4. The refrigerator according to claim 3, wherein the integrated valve assembly comprises a first inflow port connected to the water tank, a second inflow port connected to the carbonated water tank, a first outflow port connected to the carbonated water tank, and a second outflow port connected to the dispenser space.

5. The refrigerator according to claim 3, wherein the integrated valve assembly comprises a purified water supply valve to open and close the purified water supply channel, a purified water discharge valve to open and close the purified water discharge channel, a carbonated water discharge valve to open and close the carbonated water discharge channel,
wherein each of the purified water supply valve, the purified water discharge valve and the carbonated water discharge valve is a solenoid valve.

6. The refrigerator according to claim 5, wherein the integrated valve assembly is mounted to the rear surface of the door.

7. The refrigerator according to claim 1, the carbonated water tank is provided with a water level sensor to measure the amount of purified water supplied to the carbonated water tank.

8. The refrigerator according to claim 1, wherein the carbonated water tank is provided with a temperature sensor to measure a temperature of purified water supplied to the carbonated water tank or carbonated water produced in the carbonated water tank.

9. The refrigerator according to claim 1, wherein the carbonated water tank is provided with an exhaust valve to discharge carbon dioxide gas remaining in the carbonated water tank to introduce the purified water into the carbonated water tank.

10. The refrigerator according to claim 1, wherein the carbonated water tank is provided with a safety valve to discharge carbon dioxide if carbon dioxide gas supplied thereto exceeds a predetermined pressure.

11. The refrigerator according to claim 1, wherein the carbonated water discharge channel and the purified water discharge channel join together at one point to form an integrated discharge channel.

12. The refrigerator according to claim 11, wherein the integrated discharge channel is provided with a residual water discharge preventing valve to open and close the integrated discharge channel to prevent discharge of residual water.

13. The refrigerator according to claim 1, wherein the carbonated water tank is formed of a stainless steel material.

14. A refrigerator comprising:
a body;
a storage compartment formed in the body and provided with an open front;
a door to open and close the open front of the storage compartment;
a carbonated water production module provided with a module case detachably arranged at a rear surface of the door to produce carbonated water,
wherein the carbonated water production module comprises
a first module having a carbonated water tank to produce carbonated water and a first accommodation space to accommodate the carbonated water tank; and
a second module having a carbon dioxide gas cylinder to supply carbon dioxide gas to the carbonated water tank and a second accommodation space to accommodate the carbon dioxide gas cylinder, the second module being arranged at a lower side of the first module.

15. The refrigerator according to claim 14, wherein the first module comprises a first cover to open and close the first accommodation space,
the second module comprises a second cover to open and close the second accommodation space, and
the first cover and the second cover respectively open and close the first accommodation space and the second accommodation space independently of one another such that the carbon dioxide gas cylinder accommodated in the second accommodation space is allowed to be replaced by opening the second accommodation space, without opening the first accommodation space.

16. The refrigerator according to claim 15, wherein the first cover is provided with vent holes such that cool air in the storage compartment flows into the carbonated water tank to cool the carbonated water tank even when the first accommodation space is closed by the first cover.

17. The refrigerator according to claim 14, further comprising:
an ice-making unit to make ice; and
an ice guide pathway to guide ice made in the ice-making unit to an outside of the door,
wherein the second module is positioned at a lateral side of the ice guide pathway.

18. A refrigerator comprising:
a body;
a storage compartment formed in the body and provided with an open front;
a door to open and close the open front of the storage compartment;

a water tank to store purified water;

a carbonated water production module to produce carbonated water; and a dispenser arranged at the door to allow the carbonated water or the purified water to be dispensed at an outside of the refrigerator without opening the door, wherein the carbonated water production module comprises a carbon dioxide gas cylinder having carbon dioxide gas stored therein;

a carbonated water tank to mix the purified water with the carbon dioxide gas to produce the carbonated water; and a module case provided with an accommodation space to accommodate the carbon dioxide gas cylinder and the carbonated water tank, the module case being detachably coupled to a rear surface of the door.

19. The refrigerator according to claim 18, wherein the module case comprises:

a back case having one open side allowing access to the carbonated water tank and the carbon dioxide gas cylinder accommodated in the module case with the module case coupled to the rear surface of the door; and a cover detachably coupled to the one open side such that the carbonated water tank and the carbon dioxide gas cylinder are not exposed to an outside.

20. The refrigerator according to claim 18, wherein the module case is provided with vent holes such that cool air in the storage compartment flows into the accommodation space to cool the carbonated water tank.

21. The refrigerator according to claim 18, wherein the carbonated water production module comprises an integrated valve assembly to control supply of the purified water from the water tank to the carbonated water tank, supply of the purified water from the water tank to the dispenser space and supply of the carbonated water from the carbonated water tank to the dispenser space, and the integrated valve assembly is accommodated in the accommodation space.

* * * * *